(No Model.)
C. W. NICHOLSON.
PEANUT CLEANER.
No. 369,071. Patented Aug. 30, 1887.
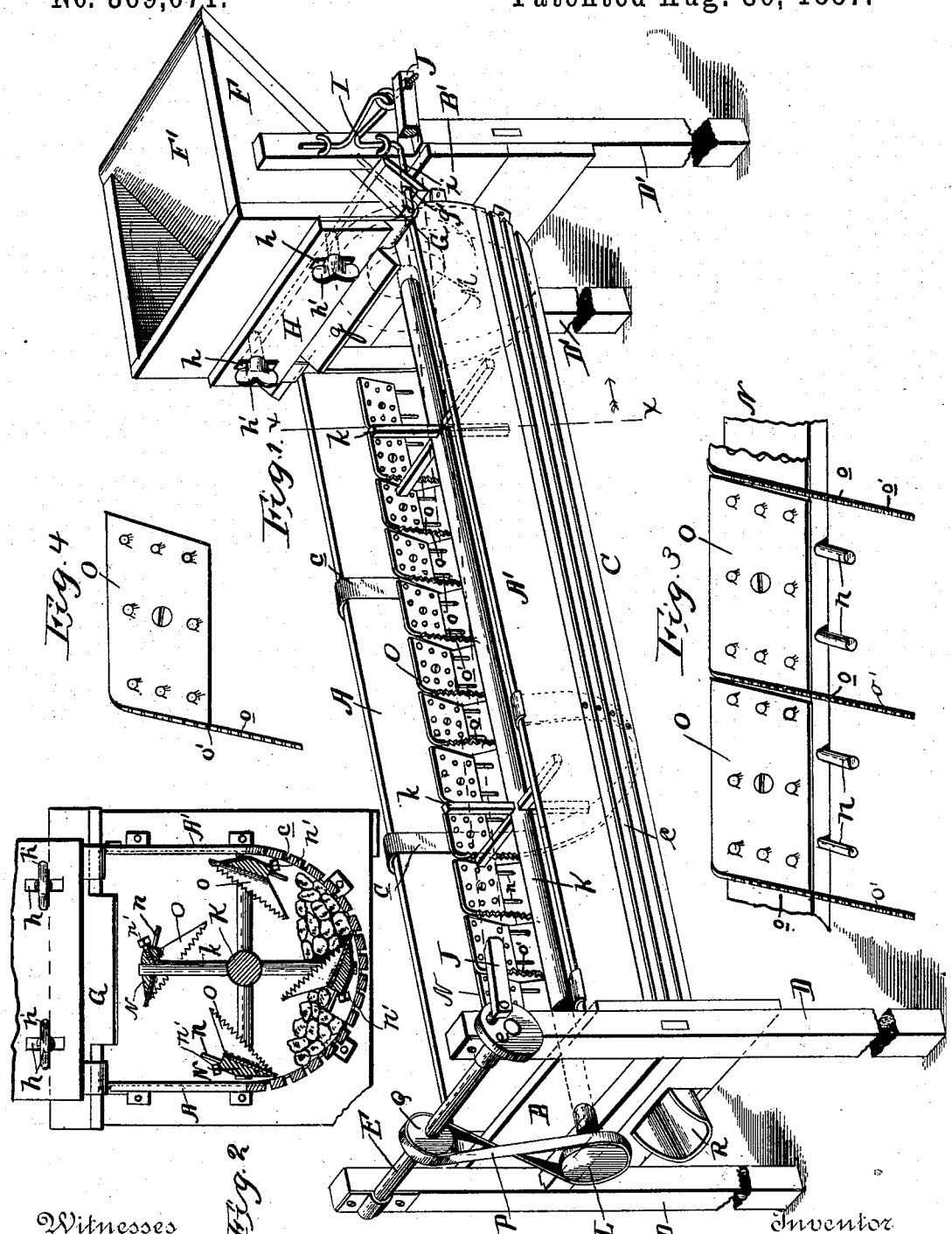

UNITED STATES PATENT OFFICE.

CHARLES WESLEY NICHOLSON, OF ASSAMOOSIC, VIRGINIA.

PEANUT-CLEANER.

SPECIFICATION forming part of Letters Patent No. 369,071, dated August 30, 1887.

Application filed November 6, 1886. Serial No. 218,142. (No model.)

*To all whom it may concern:*

Be it known that I, CHARLES WESLEY NICHOLSON, a citizen of the United States, residing at Assamoosic, in the county of Southampton and State of Virginia, have invented certain new and useful Improvements in Peanut-Cleaners; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a machine for cleaning and stemming peanuts; and it consists in the novel features more fully hereinafter set forth, claimed, and shown in the annexed drawing, in which—

Figure 1 is a perspective view of the device. Fig. 2 is a transverse sectional view on the line $x\ x$, Fig. 1. Fig. 3 is a detail view of a portion of the stirrer and cleaning shaft on an enlarged scale, and Fig. 4 is a perspective view of one of the stemming and cleaning plates.

The object of the invention is the construction of a machine for the purposes before mentioned which will be simple and compact in arrangement, economical in cost, efficient in use, and not liable to get out of repair.

The vital point of the improvement is the peculiar construction of the stemming and cleaning device, whereby the nuts fed into a trough at one end, having earth still clinging thereto and provided with the stems left after passing through the vine-stripper, are carried to the opposite end of said trough, from which they are discharged free of the dirt and stems and in a polished condition, ready for market.

The trough comprises sides A A', ends B B', rounded bottom C, and legs or supports D D'. The sides A A' are imperforate and substantially parallel. The bottom, which is semicircular in cross-section, is open and preferably composed of a number of slats placed close beside each other, leaving small spaces between their adjacent sides, and secured together by the metal strips or bars $c$, let into notches or recesses in each slat, so as to come flush with the interior of the bottom. The opposite ends of the metal strips are secured to the sides A and A'. The ends B and B' are secured in place and have the legs fastened thereto. The legs project above the top of the trough and its ends, and one set of legs, D, has the shaft E journaled thereto above the trough, and the other set of legs, D', has the hopper F secured between them. The bottom F' of the hopper slants, forming a chute, and the agitator-slide G forms the lower portion. The cut-off H, having slots $h$ near each end, is adjustably held to the wall of the hopper by set-screws $h'$. The lower portion, $g$, of the agitator-slide projects below the edge of the cut-off H, and the distance between it and the edge of the cut-off can be regulated by moving said cut-off up or down, according to the amount of feed desired. The crank-shaft I, journaled on one side of the hopper, preferably to the leg B' adjacent to the side A', has an arm, $i$, projecting therefrom and connected with the agitator-slide by passing loosely through the transverse opening $g'$ in said slide. The rod J connects the crank-shaft with the crank $e$ on the shaft E.

The stirrer and cleaner shaft comprises the shaft K, journaled longitudinally of the trough in the ends B and B', beyond which it extends, and is provided with pulleys L and M, the arms $k$, projecting at right angles from the shaft, the agitator-bars N, adjustably secured to the ends of the arms $k$ and extending longitudinally of the trough, and the stemming and cleaning plates O, which consist of plates of sheet metal having one end, $o$, bent up substantially at right angles to the plane of the agitator-bars and serrated or provided with saw-teeth $o'$ along their edges. The plates have a series of openings punched therein from the under side, forming ragged edges around the openings on the sides of the plates opposite to that from which the punching is done. By this means the faces of the plates are roughened in an economical manner for cleaning and polishing the nuts.

The stemming-blades O, which in the present instance are shown as integral parts of the plates, may be separate therefrom and independently secured to the agitator-bars N. They set at an oblique angle to the edges of the agitator-bars, and not only serve to remove the stems, but advance the nuts from one end of the trough to the other. The agitator-bars N may be adjusted in any desired manner, so that the forward edges of the plates O approach close to the inner side of the bottom of the trough and catch under the nuts without doing any injury.

In practice motion is imparted to the shaft K from any suitable source of power applied to the pulley M, and is communicated therefrom to the shaft E by the endless band P, passing around pulley L and pulley Q on the shaft E. Nuts supplied to the hopper are fed therefrom into the trough and are prevented from clogging in the hopper by the reciprocating movement of the agitator-slide operated from the shaft E through crank c, rod J, crank-shaft I, and arm i. The nuts, after entering the trough, are thoroughly agitated by the bars N and the fingers n, projecting from the rear edges thereof, in addition to the abrasion afforded by the stemming-blades and cleaning-plates. The agitation or rumbling given the nuts loosens the dirt, which, together with the stems removed by coming in contact with the serrated edges of the stemming-blades, falls through the openings in the bottom of the trough. The abrasion of the nuts against each other, the bottom, and particularly the roughened faces of the plates O, polishes them and thoroughly dislodges any dirt. The nuts are progressively moved from the upper end of the trough till they reach the discharge end, from which they are ejected through the spout R.

Having thus described my invention, what I claim, and desire to secure by Letters Patent, is—

1. The herein-described cleaner, comprising the trough, the shaft, the arms radiating from the shaft, the agitator-bars extended in the direction of the length of the trough, the roughened cleaning-plates, and the stemming-blades, arranged at an angle to the line of motion of the shaft and carried by said agitator-bars, substantially as described.

2. The combination, with the trough, of the shaft, the arms, the agitator-bars extended nearly the length of the shaft, and the stemming-blades, set at an angle to the line of motion of the bars and having their upper edges serrated and inclined from front to rear away from said bars, as shown, substantially as set forth.

3. The combination, with the trough, of the shaft, the arms, the agitator-bars arranged lengthwise of the trough, and the stemming-blades arranged at an angle to the line of motion of said agitator-bars, substantially as set forth.

4. The combination, with the trough, the shaft, and the arms, of the agitator-bars extended in the direction of the shaft and adjustably connected with the arms, and the cleaning-plates and stemming-blades secured to the agitator-bars, substantially as set forth.

5. The herein shown and described stemming-blade and cleaning-plate integrally formed, the stemming-blade having its upper edge serrated and inclining away from and arranged at an angle to the edges of the cleaning-plate, as and for the purpose described.

6. The combination, with the trough, the shaft, the arms, and the agitator-bars secured to and carried by the arms, of the stemming-blades and cleaning-plates secured to the agitator-bars on the side adjacent to the shaft, and the agitator-fingers extended from the rear edge of the agitator-bars in the direction of motion of the shaft, substantially as set forth.

In testimony whereof I affix my signature in presence of two witnesses.

CHARLES WESLEY NICHOLSON.

Witnesses:
  JOHN I. TURNER,
  J. W. WILLIAMS.